(12) United States Patent
Miyamoto

(10) Patent No.: US 8,370,587 B2
(45) Date of Patent: Feb. 5, 2013

(54) MEMORY SYSTEM STORING UPDATED STATUS INFORMATION AND UPDATED ADDRESS TRANSLATION INFORMATION AND MANAGING METHOD THEREFOR

(75) Inventor: Hironobu Miyamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 606 days.

(21) Appl. No.: 12/563,624

(22) Filed: Sep. 21, 2009

(65) Prior Publication Data

US 2010/0205391 A1   Aug. 12, 2010

(30) Foreign Application Priority Data

Feb. 12, 2009  (JP) ................. 2009-030298

(51) Int. Cl.
*G06F 12/00* (2006.01)
(52) U.S. Cl. ........ 711/156; 711/103; 711/162; 711/202; 711/206
(58) Field of Classification Search .......... 711/103, 711/156, 162, 202, 206–207, E12.001, E12.008
See application file for complete search history.

(56) References Cited

U.S. PATENT DOCUMENTS

| 7,769,945 | B2 * | 8/2010 | Lasser et al. ............. 711/103 |
| 2009/0222636 | A1 | 9/2009 | Yano et al. | |
| 2011/0173380 | A1 | 7/2011 | Yano et al. | |

FOREIGN PATENT DOCUMENTS

JP   3688835   6/2005

OTHER PUBLICATIONS

U.S. Appl. No. 12/530,467, filed Sep. 9, 2009, Junji Yano, et al.
U.S. Appl. No. 12/529,145, filed Aug. 28, 2009, Junji Yano, et al.
U.S. Appl. No. 12/529,223, filed Aug. 31, 2009, Junji Yano, et al.
U.S. Appl. No. 12/529,227, filed Aug. 31, 2009, Junji Yano, et al.
John L. Hennessy, et al., "Computer Architecture. A Quantitative Approach third edition", 5 pages.

* cited by examiner

*Primary Examiner* — Jasmine Song
(74) *Attorney, Agent, or Firm* — Oblon, Spivak, McClelland, Maier & Neustadt, L.L.P.

(57) ABSTRACT

A memory system in which a first management unit includes an update information managing unit that manages update information indicating an updated section in status information stored in a volatile first storing unit, and an update information notifying unit that notifies a second management unit of the update information managed by the update information managing unit, and the second management unit includes a commit executing unit that collects, based on the update information, difference information of the status information from the status area when the update information is notified from the update information notifying unit, and causes a second storing unit to accumulate the difference information in a backup area.

20 Claims, 11 Drawing Sheets

(a) DURING NORMAL OPERATION (b) DURING EXECUTION OF FIRST COMMIT PROCESSING (c) DURING EXECUTION OF SECOND COMMIT PROCESSING
(DURING UPDATE INFORMATION NOTIFICATION)

(d) DURING EXECUTION OF SNAPSHOT PROCESSING

MEMORY SYSTEM STORING UPDATED STATUS INFORMATION AND UPDATED ADDRESS TRANSLATION INFORMATION AND MANAGING METHOD THEREFOR

CROSS-REFERENCE TO RELATED APPLICATIONS

This application is based upon and claims the benefit of priority from the prior Japanese Patent Application No. 2009-030298, filed on Feb. 12, 2009; the entire contents of which are incorporated herein by reference.

BACKGROUND OF THE INVENTION

1. Field of the Invention

The present invention relates to a memory system and a managing method for the memory system.

2. Description of the Related Art

As an external storage device used for a computer system, a solid state drive (SSD) mounted with a flash memory (a flash EEPROM) as a nonvolatile memory attracts attention. The flash memory has advantages such as high speed and light weight compared with a magnetic disk device.

The SSD includes a plurality of flash memory chips, a controller that performs read and write control for the nonvolatile memory according to a request from a host apparatus, a volatile buffer memory for performing data transfer between the nonvolatile memory and the host apparatus, a power supply circuit, and a connection interface to the host apparatus (see, for example, Japanese Patent No. 3688835).

BRIEF SUMMARY OF THE INVENTION

A memory system according to an embodiment of the present invention comprises: a volatile first storing unit including a status area for storing status information for notification to a host apparatus; a nonvolatile second storing unit including a backup area for storing a backup copy of the status information; and a controller including a first management unit that controls data transfer between the host apparatus and the first storing unit and that manages the status information, and a second management unit that controls data transfer between the first storing unit and the second storing unit, wherein the first management unit includes an information writing unit that updates the status information according to a status of the memory system, an update information managing unit that manages update information indicating an updated section updated by the information writing unit, and an update information notifying unit that notifies the second management unit of the update information managed by the update information managing unit, the second management unit includes a commit executing unit that collects, based on the update information, difference information of the status information from the status area when the update information is notified from the update information notifying unit, and causes the second storing unit to accumulate the difference information in the backup area.

A memory system according to an embodiment of the present invention comprises: a volatile first storing unit including a status area for storing status information for notification to a host apparatus; a nonvolatile second storing unit including a backup area for storing a backup copy of the status information; and a controller including a first management unit that controls data transfer between the host apparatus and the first storing unit and that manages the status information, and a second management unit that controls data transfer between the first storing unit and the second storing unit, wherein the first management unit includes an information writing unit that causes the first storing unit to accumulate, in the status area, difference information of the status information, and the second management unit includes a commit executing unit that reflects the difference information on the status information in the status area at specific timing and causes the second storing unit to accumulate the difference information in the backup area.

A managing method according to an embodiment of the present invention comprises: securing, in a volatile first storing unit, a status area for storing status information for notification to a host apparatus; securing, a nonvolatile second storing unit, a backup area for storing a backup copy of the status information; updating the status information according to a status of the memory system and generating update information indicating an updated section; and collecting, based on the update information, difference information of the status information from the status area and causing the second storing unit to accumulate the difference information in the backup area.

DETAILED DESCRIPTION OF THE INVENTION

As a connection interface to a host apparatus widely spread to the public, there is the ATA interface standard. As means for improving reliability of storage device in the ATA interface standard, there is a self-monitoring analysis and reporting technology (SMART) function.

The SMART function is a function of recording a cumulative number of times of read and write errors, cumulative operation time, and the like in an external storage device, predicting a failure (aged deterioration) that gradually worsens, and notifying a host apparatus of the failure in advance to prevent loss of data due to occurrence of a significant failure.

A record for the SMART function during power supply interruption needs to be taken over during the next starting. Therefore, the record is stored in a nonvolatile storage area included in the external storage device.

In the field of the SSD, there is a demand for a technology for, without complicating firmware for executing read and write control by a controller, making it possible to write, in a nonvolatile memory, various kinds of management information (hereinafter, "status information") specified to be recorded according to a connection interface standard like the record explained above.

Exemplary embodiments of a memory system and a managing method for the memory system according to the present invention will be explained below in detail with reference to the accompanying drawings. The present invention is not limited to the following embodiments.

Figure 1:
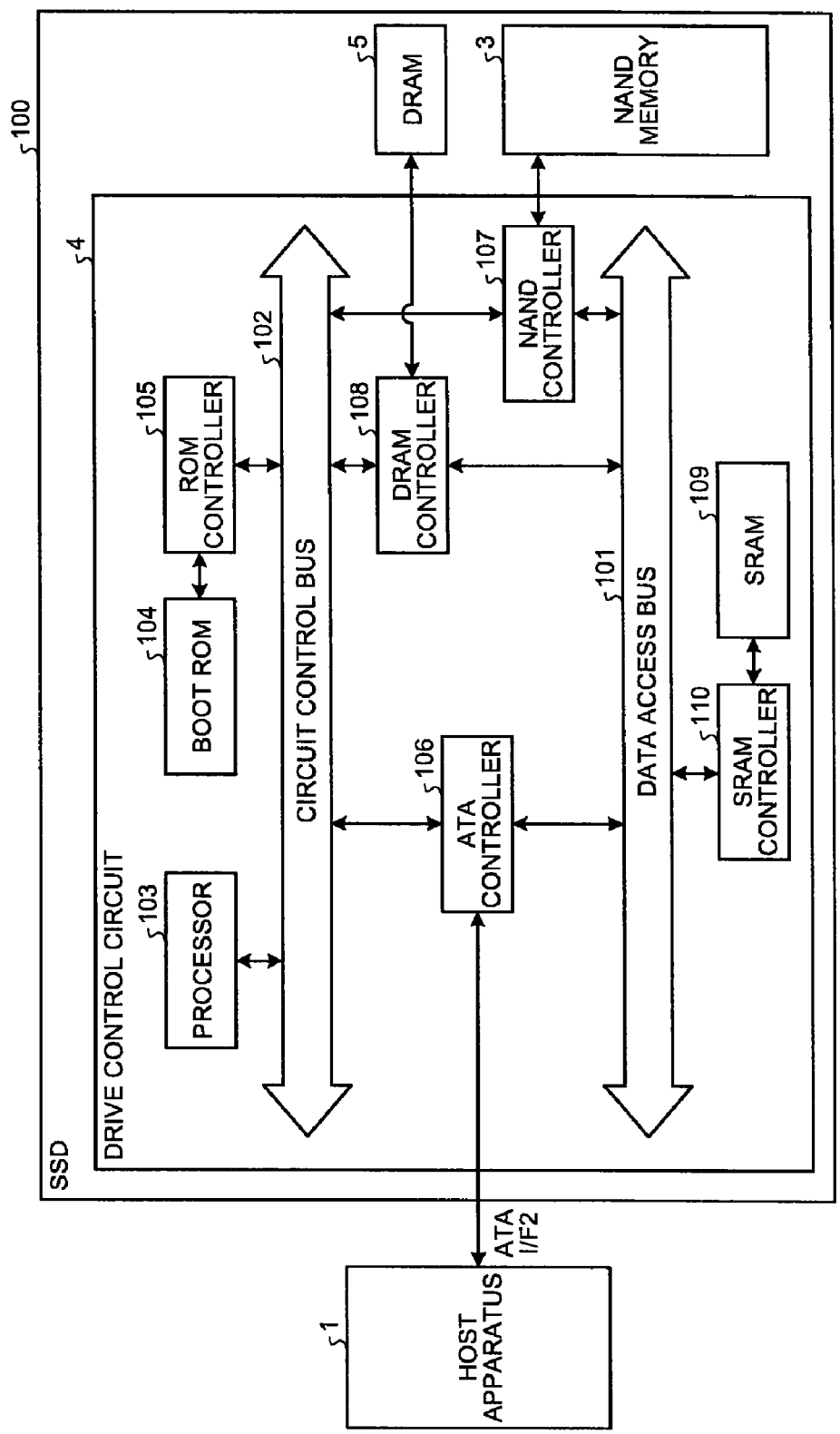
FIG. 1 is a block diagram of a configuration example of a SSD according to a first embodiment of the present invention.

FIG. 1 is a block diagram of a configuration example of a SSD 100 according to a first embodiment of the present invention. The SSD 100 is connected to a host apparatus 1 such as a personal computer or a central processing unit (CPU) core via a memory connection interface such as an ATA interface (ATA I/F) 2 and functions as an external storage device for the host apparatus 1. The SSD 100 includes a NAND flash memory (hereinafter, "NAND memory") 3 as a nonvolatile semiconductor memory, a drive control circuit 4 as a controller, and a dynamic random access memory (DRAM) 5 as a volatile semiconductor memory. Data (user data) requested by the host apparatus 1 to be written is written in the NAND memory 3 via the DRAM 5. User data requested by the host apparatus 1 to be read out is read out from the NAND memory 3 and transferred to the host apparatus 1 via the DRAM 5.

The NAND memory 3 stores the user data and also stores management information (various management tables such as a logical address-to-physical address conversion table) that associates, for each of the user data, a logical address (e.g., logical block addressing (LBA)) supplied from the host apparatus 1 and a NAND address (a physical address) used in the SSD 100. In the NAND memory 3, a status area is secured. The status area is an area for storing a read and write error as a record (status information) based on a SMART function, which is one of functions specified in the ATA interface standard, temperature information and operation time of the NAND memory 3, and the like.

The DRAM 5 functions as a cache for data transfer between the host apparatus 1 and the NAND memory 3, a work area memory, and the like.

The drive control circuit 4 controls the NAND memory 3 and the DRAM 5 to perform data transfer control between the host apparatus 1 and the NAND memory 3. As a configuration for performing the data transfer control, the drive control circuit 4 further includes components explained below. Specifically, the drive control circuit 4 includes a data access bus 101 and a circuit control bus 102. A processor 103 that controls the entire drive control circuit 4 is connected to the circuit control bus 102. A boot random access memory (ROM) 104, in which a boot program for booting a management program (firmware) stored in the NAND memory 3 is stored, is connected to the circuit control bus 102 via a ROM controller 105.

An ATA interface controller (ATA controller) 106, a NAND controller 107, and a DRAM controller 108 are connected to both the data access bus 101 and the circuit control bus 102. The ATA controller 106 transmits and receives user data to and from the host apparatus 1 via the ATA interface 2. The NAND controller 107 transmits and receives data to and from the NAND memory 3. A static random access memory (SRAM) 109 used as a data work area and a firmware expansion area is connected to the data access bus 101 via a SRAM controller 110. During starting, the firmware stored in the NAND memory 3 is transferred to the SRAM 109 by the boot program stored in the boot ROM 104.

Figure 2:
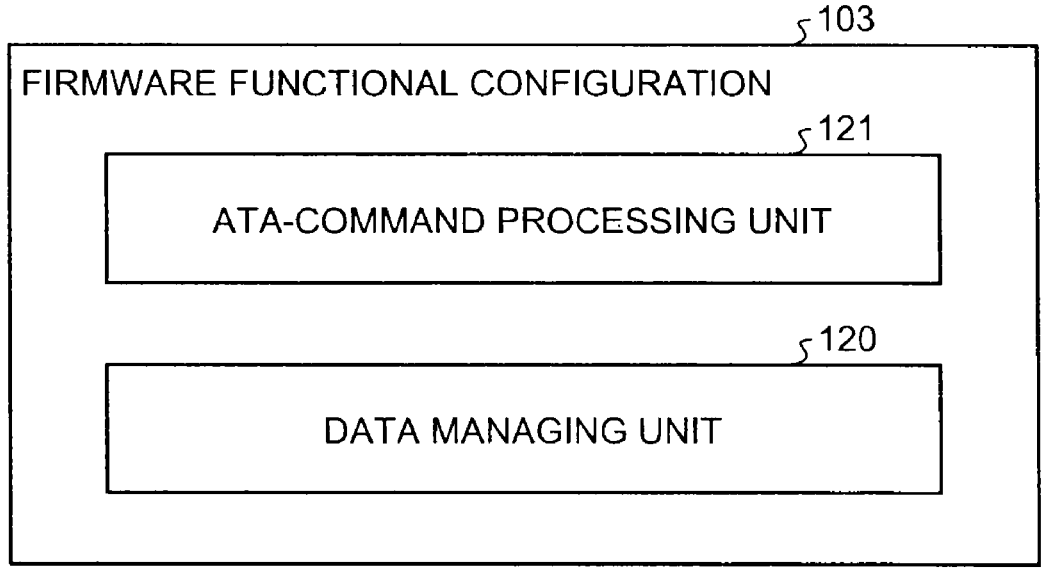
FIG. 2 is a block diagram of a functional configuration of firmware.

FIG. 2 is a block diagram of a functional configuration of firmware realized by the processor 103. Functions of the firmware are roughly classified into an ATA-command processing unit (a first management unit) 121 and a data managing unit (a second management unit) 120.

The data managing unit 120 executes control of data transfer between the NAND memory 3 and the DRAM 5 via the NAND controller 107 and the DRAM controller 108. When the data managing unit 120 accesses the NAND memory 3, the data managing unit 120 needs to use management information, which is information that associates, for each of data, a logical address and a NAND address supplied from the host apparatus 1, to find an access destination in the NAND memory 3. The management information is stored in the nonvolatile NAND memory 3 as explained above. The management information stored in the NAND memory 3 is expanded in a work area of the volatile DRAM 5 during starting of the SSD 100. The data managing unit 120 executes, based on the expanded management information, control for reading user data from and writing user data in the NAND memory 3 and sequentially updates the management information expanded on the DRAM 5.

Even if a power supply is interrupted, the management information expanded on the DRAM 5 needs to be restored to a state before the power supply is interrupted. The data managing unit 120 has a function of executing snapshot processing and commit processing to store, in the nonvolatile NAND memory 3 in the nonvolatile NAND memory 3, the management information on the DRAM 5. Snapshot indicates entire management information on the NAND memory 3. In the following explanation, directly storing the management table expanded in the DRAM 5 in the NAND memory 3 is represented as taking a snapshot. A log indicates a change difference of the management information. If the snapshot is taken every time the management information on the DRAM 5 is updated, processing speed is low and the number of writings in the NAND memory 3 increases. Therefore, usually, the log as the change difference is recorded in the NAND memory 3. In the following explanation, storing management information obtained by reflecting the log on the management information on the DRAM in the NAND memory 3 is represented as committing.

Figure 3:
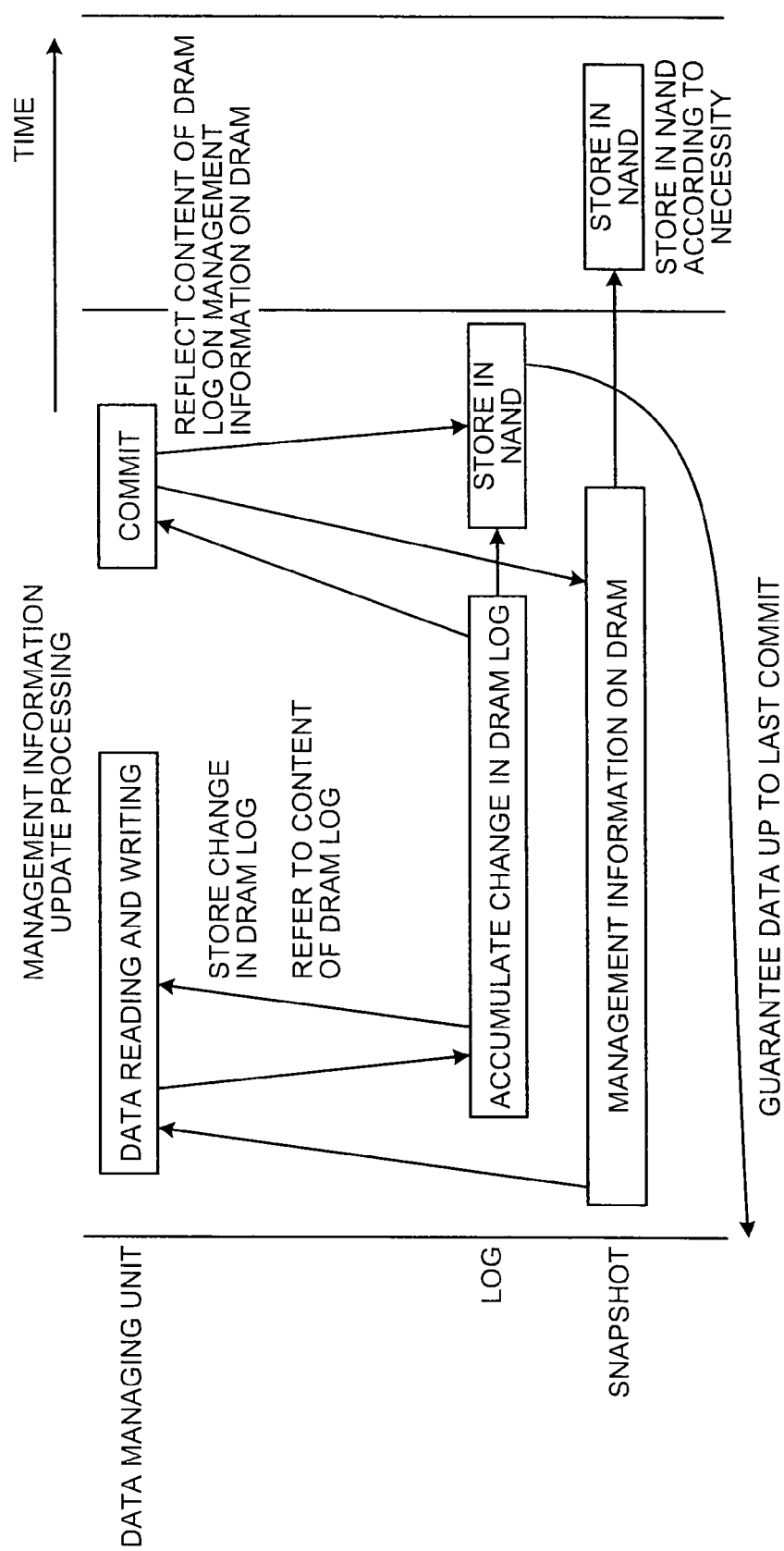
FIG. 3 is a diagram of update operation by snapshot processing and commit processing.

How the management information stored in the NAND memory 3 is updated by the snapshot processing and the commit processing is shown in FIG. 3. When the data managing unit 120 updates the management information on the DRAM 5, content of a change to the management information on the DRAM 5 is stored in the log on the DRAM 5. In some case, the management information on the DRAM 5 is directly updated and content of the update is stored in the log on the DRAM 5. In other cases, the management information on the DRAM 5 is not directly changed and a change area is secured on a DRAM log to record content of the update in the area. In reading and writing processing for user data, the log on the DRAM 5 is referred to besides the management information on the DRAM 5.

When the update of the data is stabilized, commit of the log is performed. In the commit processing, content of the log on the DRAM 5 is reflected on the management information as required and content of the DRAM log is stored in the NAND memory 3 and non-volatilized. The snapshot is stored in the NAND memory 3, for example, when a storage area of the log is insufficient in a normal power supply interruption sequence. When the log or the snapshot is finished to be written in the NAND memory 3, the non-volatilization of the management information is completed.

The ATA-command processing unit 121 performs data transfer processing between the DRAM 4 and the host apparatus 1 in cooperation with the data managing unit 120 via the ATA controller 106 and the DRAM controller 108. The ATA-command processing unit 121 has a function of managing the status information based on the SMART function. Specifically, the ATA-command processing unit 121 executes update of the status information when a read and write error occurs anew, when recording timing for temperature information of the NAND memory 3 comes, or when recording time for operation time comes.

As explained above, because the status information is information that should be taken over during the next starting, the status information needs to be stored in the NAND memory 3. Writing in the NAND memory 3 is executed under the control by the data managing unit 120. When the ATA-command processing unit 121 is configured to directly write the status information in the NAND memory 3, conflict with access from the data managing unit 120 is caused. If a mechanism for eliminating the conflict is mounted on the firmware, the structure of the firmware is extremely complicated. The complication of the firmware could cause a fall in performance of the entire SSD 100. As a characteristic of the first embodiment, the ATA-command processing unit 121 writes the status information in the NAND memory 3 making use of the mechanisms of the snapshot and the log without complicating the firmware. Specifically, the ATA-command processing unit 121 writes the status information in the DRAM 5. The data managing unit 120 sets not only the management information but also the status information written in the DRAM 5 as snapshot and commit targets. In the following explanation, the management information managed by the data managing unit 120 is represented as data manager (DM) information and the status information managed by the ATA-command processing unit 121 is represented as ATA manager (AM) information.

Figure 4:
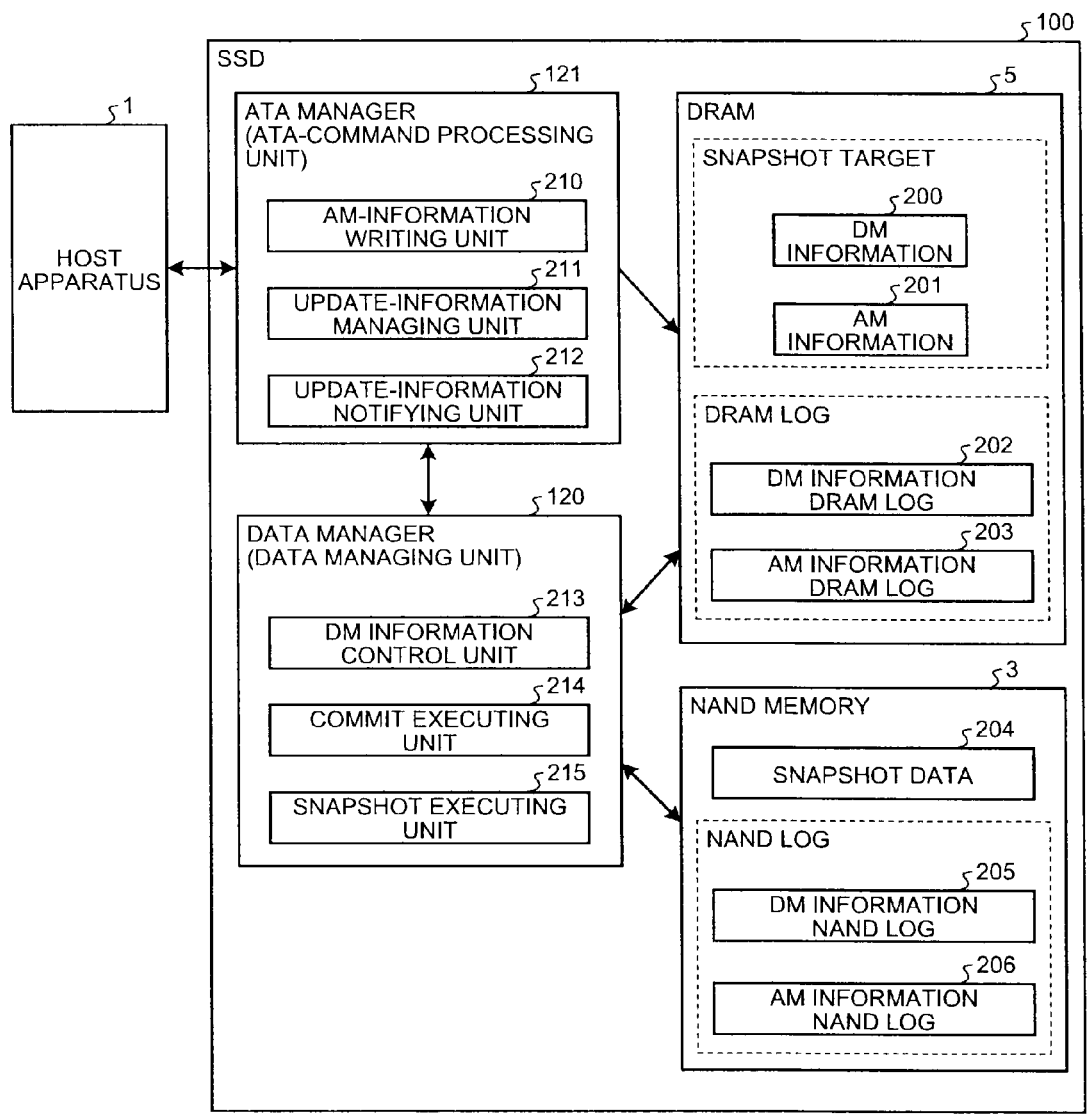
FIG. 4 is a block diagram for explaining a functional configuration of the SSD according to the first embodiment.

FIG. 4 is a block diagram for explaining a functional configuration of the SSD 100 according to the first embodiment for realizing the characteristic explained above. In the DRAM 5, DM information 200 as the management information expanded on the DRAM 5, a DM information DRAM log 202 as content of a change to the DM information 200, AM information 201 as the status information, and an AM information DRAM log 203 as content of a change to the AM information 201 are stored. The DM information 200 and the AM information 201 are snapshot targets. The DM information DRAM log 202 and the AM information DRAM log 203 are commit targets. In other words, status areas for storing the status information are secured in a part of a storage area for data as a snapshot target and a part of a storage area for data as a commit target. In the following explanation, the DM information 200 and the AM information 201 may be generally represented as snapshot target information. A DRAM log includes the DM information DRAM log 202 and the AM information DRAM log 203.

In the NAND memory 3, besides not-shown user data, snapshot data 204 as snapshots of the snapshot targets (the DM information 200 and the AM information 201), a DM information NAND log 205 as the DM information DRAM log 202 non-volatilized by the commit processing, and an AM information NAND log 206 as the AM information DRAM log 203 non-volatilized by the commit processing are stored. In other words, a backup area for storing the snapshot data 204 and the AM information NAND log 206 as backups of the status information is secured in the NAND memory 3. In the following explanation, a NAND log includes the DM information NAND log 205 and the AM information NAND log 206.

The ATA manager 121 as the ATA-command processing unit includes an AM-information writing unit 210, an update-information managing unit 211, and an update-information notifying unit 212. The AM-information writing unit 210 updates the AM information 201 stored in the DRAM 5 when an event such as update of the status information occurs, for example, when a read and write error is detected anew. The update-information managing unit 211 records and manages, every time update of the AM information 201 is performed, an address and size of an updated section on the DRAM 5 as update information. The update-information notifying unit 212 notifies, at specific timing, a data manager 120 explained later of the update information managed by the update-information managing unit 211.

Figure 5:
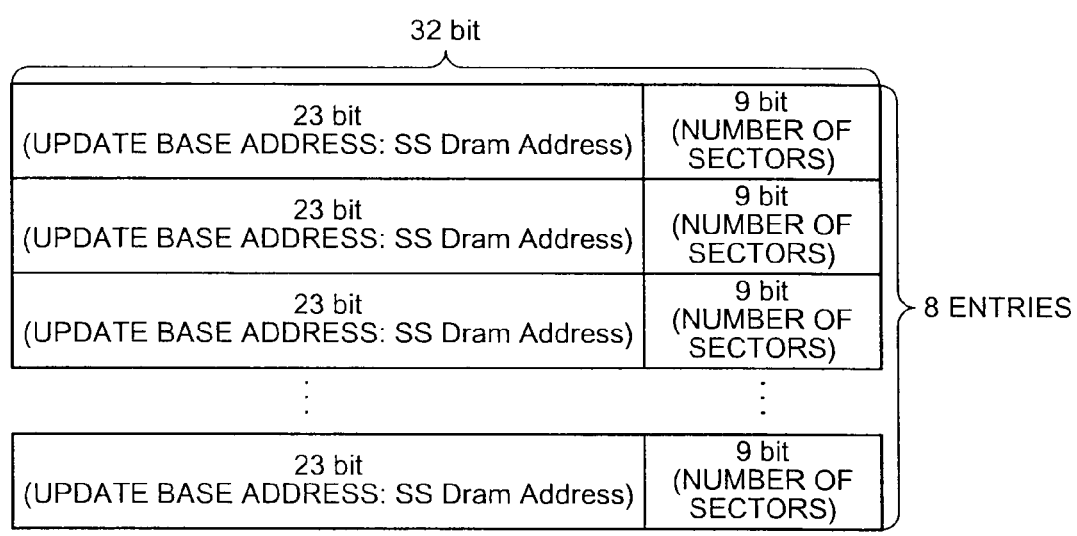
FIG. 5 is a diagram for explaining an example of update information.

FIG. 5 is a diagram for explaining an example of the update information. As shown in the figure, one updated section is recorded and managed by one entry including a starting address and size of the updated section. One entry is managed by one data having an M-bit fixed length. A starting address (an update base address) of snapshot target information in the DRAM 5 is described in top N bits of the M-bit length data. Data size (the number of sectors, each of which includes 512 bytes) corresponding to the updated section from the starting address is described in the other M-N bits. The update-information managing unit 211 can record and manage a plurality of (eight) updated sections. For example, the update information can be stored in a specific area of the DRAM 5 and sequentially updated or can be stored in a storage area other than the DRAM 5 and sequentially updated. The update-information notifying unit 212 notifies the data manager 120 of the update information in which updated sections equal to or smaller than eight entries are stored. After the notification, the update information is erased.

Referring back to FIG. 4, the data manager 120 as the data-management unit includes a DM-information control unit 213, a commit executing unit 214, and a snapshot executing unit 215. The DM-information control unit 213 performs reading and writing control for user data based on the DM information 200 stored in the DRAM 5 and the DM information DRAM log 202 as storage information of a change difference of the DM information 200. In updating the DM information 200, the DM-information control unit 213 causes the DM information DRAM log 202 to further accumulate and store only difference information before and after update of the DM information 200. When reading and writing of the user data is stabilized, the commit executing unit 214 reflects content of the DM information DRAM log 202 on the DM information 200, stores content of the DM information DRAM log 202 as the DM information NAND log 205, and non-volatilizes the content of the DM information DRAM log 202 (first commit processing). The commit executing unit 214 receives the update information from the update-information notifying unit 212. The commit executing unit 214 collects, based on the received update information, an update difference from the AM information 201 as the AM information DRAM log 203, reflects content of the DM information DRAM log 202 on the DM information 200, writes the AM information DRAM log 203 and the DM information DRAM log 202 in the NAND memory 3 as the AM information NAND log 206 and the DM information NAND log 205, respectively, and non-volatilizes the AM information DRAM log 203 and the DM information DRAM log 202 (second commit processing). When normal power supply interruption is executed or when a log storage area on the DRAM 5 or the NAND memory 3 is insufficient, the snapshot executing unit 215 takes a snapshot of snapshot target information and non-volatilizes the snapshot target information as the snapshot data 204. When the snapshot processing or the commit processing is performed, the DRAM log accumulated and stored on the DRAM 5 is deleted. When the snapshot processing is performed, the NAND log is also deleted.

Figure 6A:
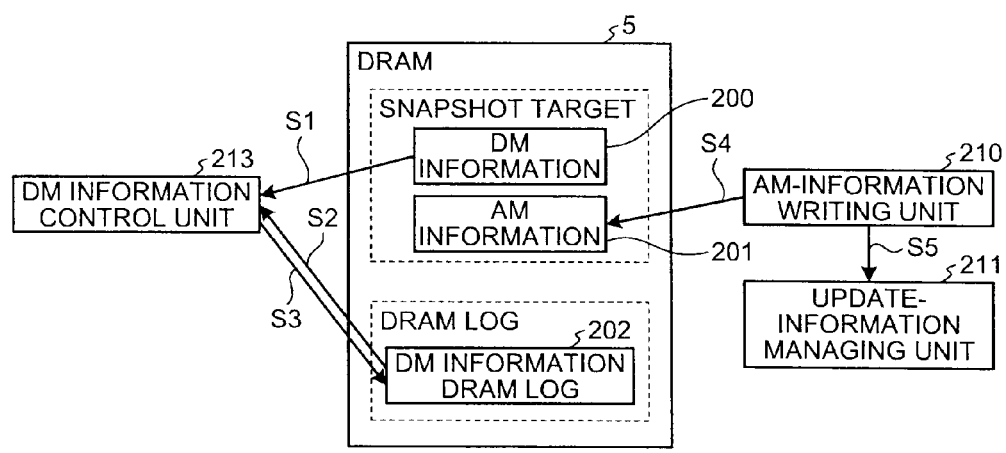
FIG. 6A is a diagram for explaining operation during execution of the commit processing and the snapshot processing.
Figure 6A:
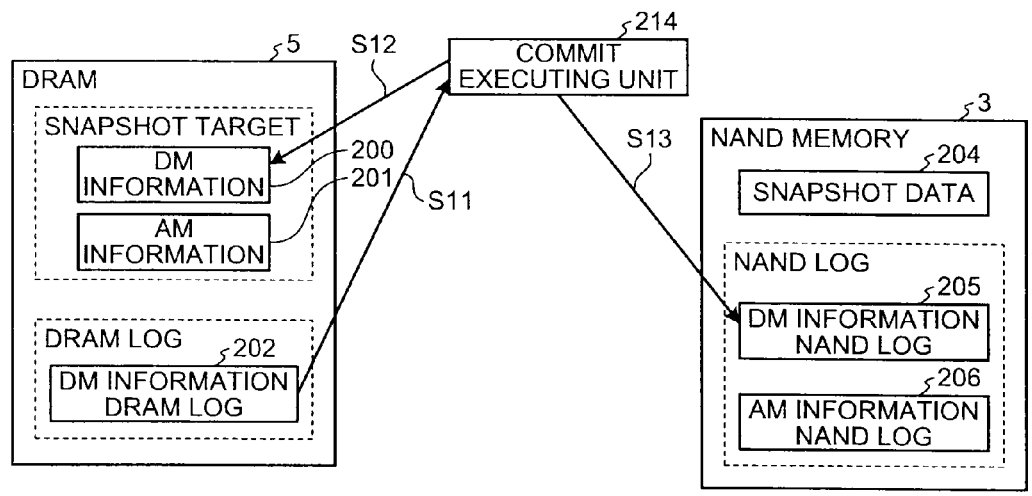

(a) of FIG. 6A is a diagram for explaining operation performed during normal operation, i.e., when both the commit processing and the snapshot processing are not executed. As shown in the figure, during the normal operation, the DM-information control unit 213 reads out the DM information 200 (step S1), reads out the DM information DRAM log 202 (step S2), and executes reading and writing of user data based on the read-out DM information 200 and DM information DRAM log 202. In updating the DM information 200, the DM-information control unit 213 causes the DM information DRAM log 202 to accumulate and store an updated section of the DM information 200 (step S3). Steps S1 to S3 are repeatedly executed every time the user data is accessed. In this explanation, the DM information DRAM log 202 is recorded without directly changing the DM information 200 on the DRAM 5. However, in some case, the DM information 200 on the DRAM 5 is directly updated and update content is stored in the DM information DRAM log 202. On the other hand, the AM-information writing unit 210 updates the AM information 201 every time status information is updated (step S4). The update-information managing unit 211 manages information in a section updated by the AM-information writing unit 210 as update information (step S5).

(b) of FIG. 6A is a diagram for explaining the operation of the first commit processing. The commit executing unit 214 reads out the DM information DRAM log 202 (step S11), reflects the read-out DM information DRAM log 202 on the DM information 200 (step S12), and writes the read-out DM information DRAM log 202 in the NAND memory 3 as the DM information NAND log 205 (step S13). The DM information DRAM log 202 is erased after the execution of the first commit processing. Consequently, even if illegal end or the like occurs, the power supply is interrupted, and content stored in the DRAM 5 disappears, DM information in the latest state can be restored based on the snapshot data 204 and the DM information NAND log 205.

Figure 6B:
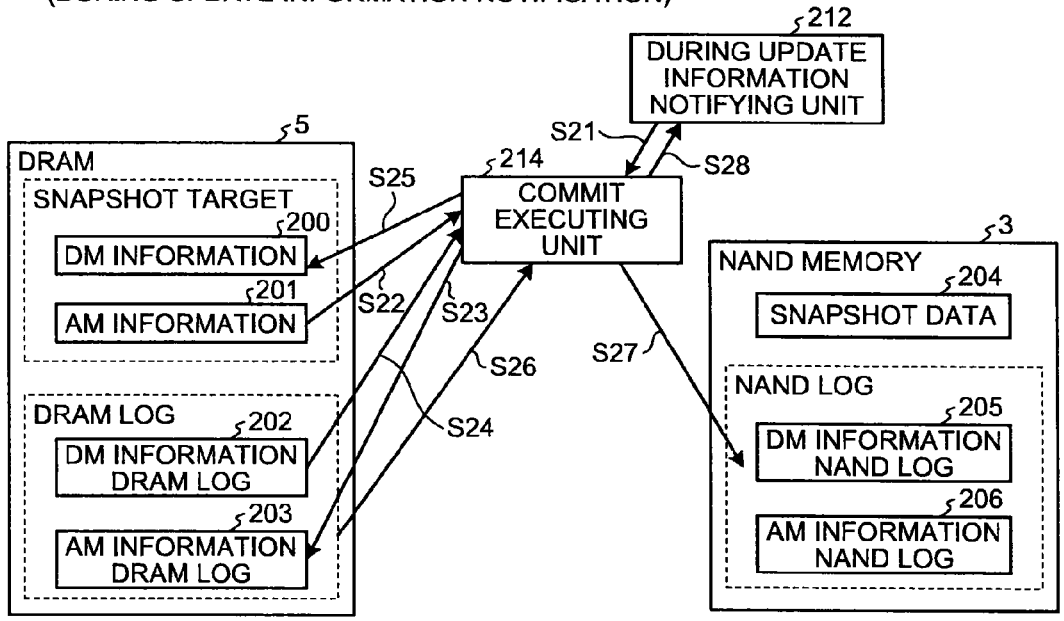
FIG. 6B is a diagram for explaining operation during execution of the commit processing and the snapshot processing.
Figure 6B:
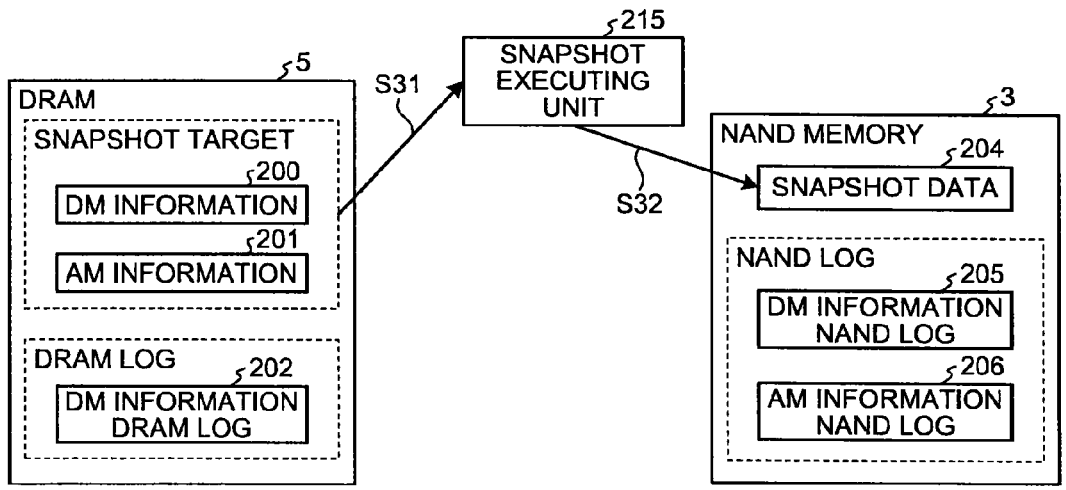

(c) of FIG. 6B is a diagram for explaining the operation of the second commit processing. The commit executing unit 214 receives update information from the update-information notifying unit 212 (step S21). The commit executing unit 214 reads out data in an updated section in the AM information 201 based on a starting address and size of the updated section described in the received update information (step S22). The commit executing unit 214 writes the read-out data of the updated section in the DRAM 5 as the AM information DRAM log 203 (step S23). Further, the commit executing unit 214 reads out the DM information DRAM log 202 (step S24) and reflects the read-out DM information DRAM log 202 on the DM information 200 (step S25). The commit executing unit 214 reads out the two kinds of DRAM logs (the DM information DRAM log 202 and the AM information DRAM log 203) on the DRAM 5 (step S26). The commit executing unit 214 writes the read-out two kinds of DRAM logs in the NAND memory 3 and sets the DRAM logs as the DRAM information NAND log 205 and the AM information NAND log 206, respectively (step S27). When the operation at step S27 ends, the commit executing unit 214 transmits update end notification to the update-information notifying unit 212 (step S28). After the execution of the second commit processing, the DRAM logs are erased. Difference content of AM information included in the snapshot data 204 is updated by the second commit processing. Therefore, AM information on the NAND memory 3 is substantially equal to the latest state. Consequently, even if illegal end or the like occurs, the AM information 201 in the latest state, i.e., status information can be restored based on the snapshot data 204 and the AM information NAND log 206. In other words, the status information immediately before the end can be taken over even after restart.

(d) of FIG. 6B is a diagram for explaining the operation of the snapshot processing. The snapshot executing unit 215 reads out the DM information 200 and the AM information 201 (step S31) and stores the DM information 200 and the AM information 201 in the NAND memory 3 as the snapshot data 204 (step S32). After the execution of the snapshot processing, the DM information DRAM log 202 is erased. The DRAM logs are not reflected in the snapshot processing. Therefore, it is advisable to execute the first commit processing before the snapshot processing. Consequently, even after the SSD 100 is ended by normal end processing and restarted, the status information immediately before the end can be taken over.

As explained above, according to the first embodiment, the status area for storing the AM information (the status information) notified to the host apparatus managed by the ATA manager is secured in the DRAM (the first storing unit). The ATA manager updates the AM information on the DRAM and notifies the data manager of the update information indicating the updated section by the update. When the update information is notified from the ATA manager, the data manager collects, based on the notified update information, the AM information DRAM log as the difference content before and after the update of the AM information and causes the NAND memory (the second storing unit) to accumulate and store the collected AM information DRAM log as the AM information NAND log. The latest AM information can be restored based on the non-volatilized snapshot data and AM information NAND log. As a result, it is possible to write the status information, which is specified to be recorded according to the connection interface standard, in a nonvolatile memory without complicating the firmware.

In the above explanation, the status information based on the SMART function is explained as an example of information requested to be stored based on the connection interface standard. However, status information, a writing source of which is the ATA manager 120, is not limited to the information concerning the SMART function. Information stored in the NAND memory 3 by snapshot or commit and used by the ATA manager 121 is not limited to the status information.

According to the first embodiment, when an event such as update of the status information occurs, the ATA manager directly updates the AM information as the status information stored on the DRAM. However, according to a second embodiment of the present invention, update content is accumulated and stored in an AM information DRAM log, which is changed content of the AM information, rather than in the AM information.

Figure 7:
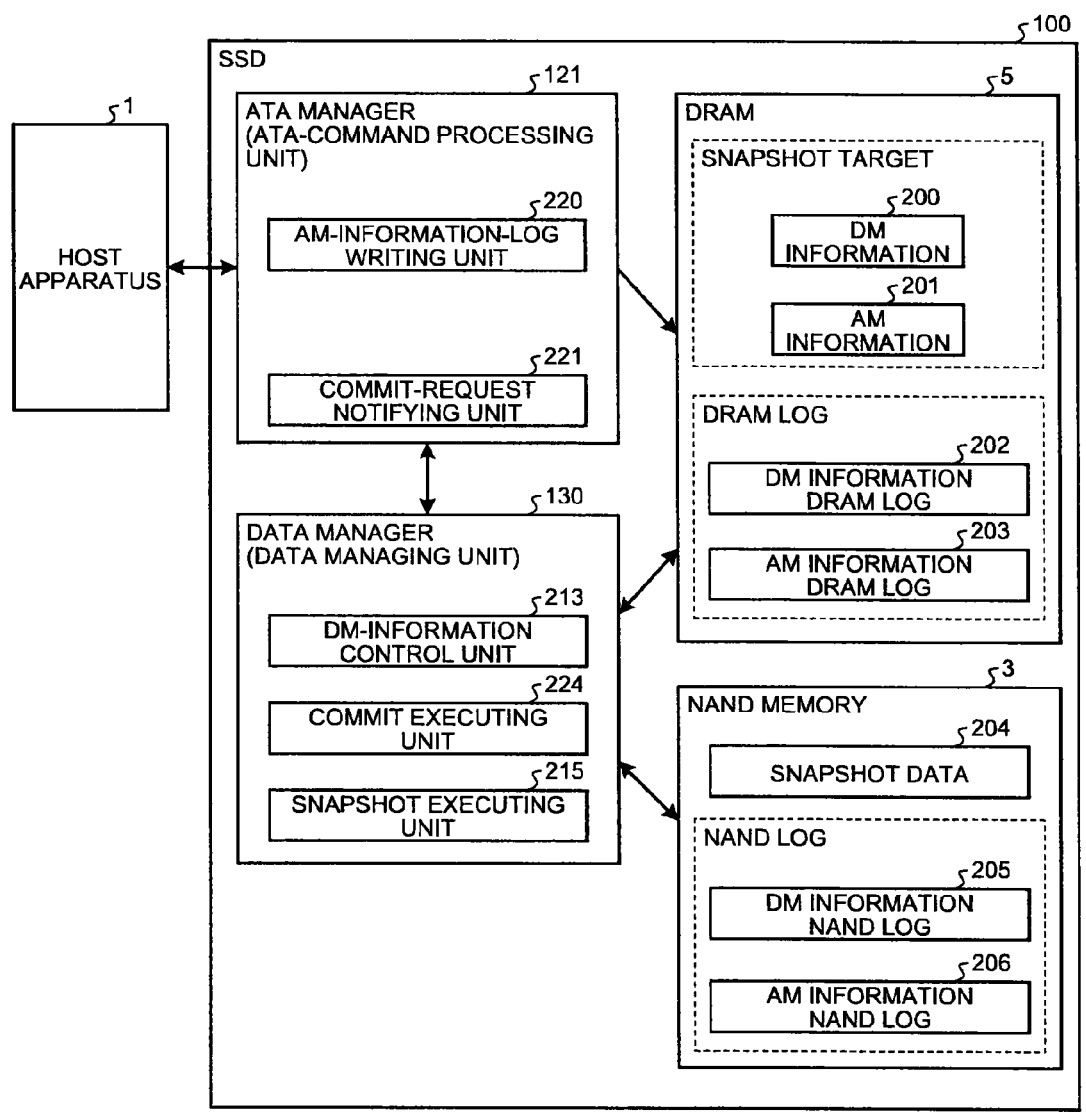
FIG. 7 is a diagram for explaining a functional configuration of a SSD according to a second embodiment of the present invention.

FIG. 7 is a diagram for explaining a functional configuration of an SSD according to the second embodiment. Components having functions same as those in the first embodiment are denoted by the same reference numerals and signs. Redundant explanation of the components is omitted.

As shown in FIG. 7, in the SSD 100 according to the second embodiment, an ATA manager 131 includes an AM-information-log writing unit 220 and a commit-request notifying unit 221. When an event such as update of the status information occurs, the AN-information-log writing unit 220 causes the AM information DRAM log 203 to accumulate and store update content. The commit-request notifying unit 221 transmits commit request notification to a data manager 130 explained later. Timing for transmitting the commit request notification can be, for example, timing when the AM information DRAM log 203 completes accumulation and storage of one update content or timing when the AM information DRAM log 203 completes accumulation and storage of a plurality of update contents.

The data manager 130 includes a DM-information control unit 213, a commit executing unit 224, and a snapshot executing unit 215. Functions of the DM-information control unit 213 and the snapshot executing unit 215 are the same as those in the first embodiment.

The commit executing unit 224 reads out a DRAM log, reflects the read-out DRAM log on snapshot target information, writes the DRAM log in the NAND memory 3, and non-volatilizes the DRAM log as a NAND log (third commit processing). When the commit executing unit 224 receives commit request notification, the commit executing unit 224 executes processing same as the third commit processing (fourth commit processing).

Figure 8:
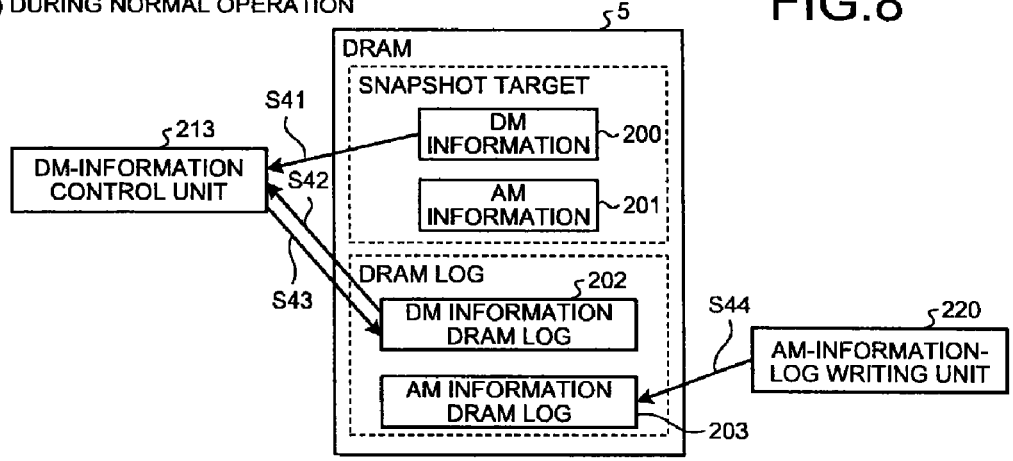
FIG. 8 is a diagram for explaining operation during execution of the commit processing and the snapshot processing.
Figure 8:
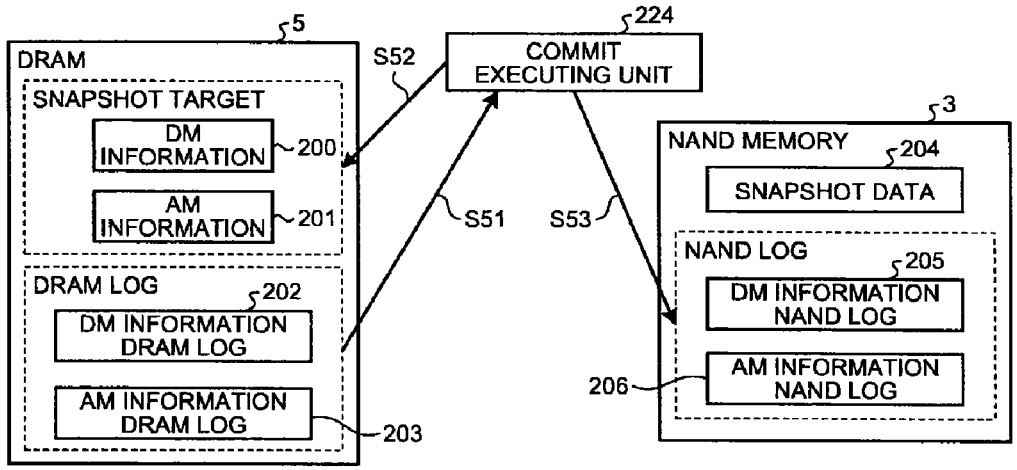
Figure 8:
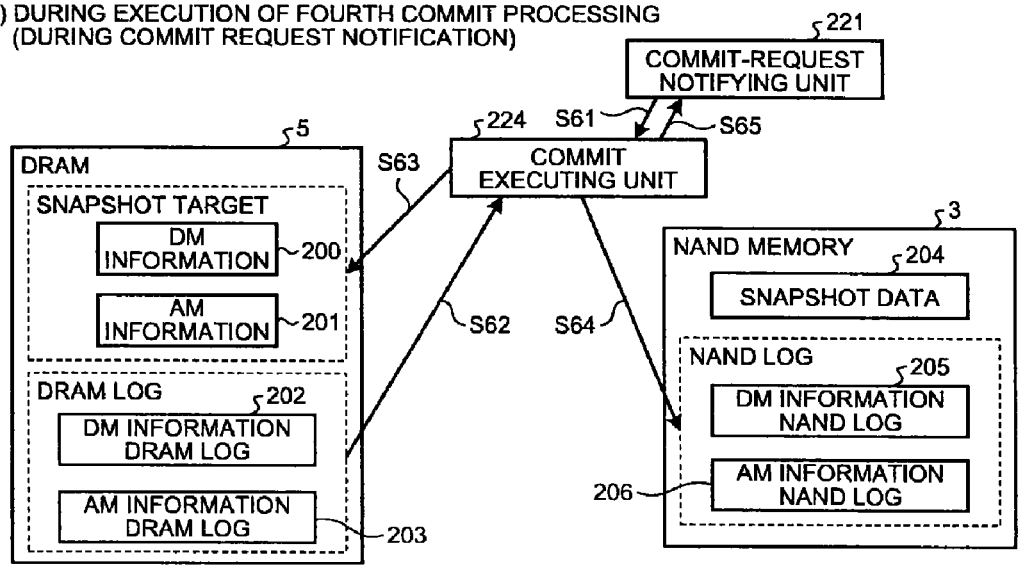

FIG. 8 is a diagram for explaining operation during execution of the commit processing and the snapshot processing. The operation of the snapshot processing is the same as that in the first embodiment. Therefore, explanation of the operation of the snapshot processing is omitted. (a) of FIG. 8 is a diagram for explaining operation during normal operation. As shown in the figure, the DM-information control unit 213 executes, at steps S41 to S43, operation same as the operation at steps S1 to S3. On the other hand, the AM-information-log writing unit 220 updates the AM information DRAM log 203 every time status information is updated (step S44).

(b) of FIG. 8 is a diagram for explaining the operation of the third commit processing. The commit executing unit 224 reads out a DRAM log (step S51), reflects the read-out DRAM log on snapshot target information (step S52), and writes the read-out DRAM log in the NAND memory 3 as a NAND log (step S53). The DRAM log is erased after the execution of the third commit processing.

(c) of FIG. 8 is a diagram for explaining the operation of the fourth commit processing. The commit executing unit 224 receives commit request notification from the commit-request notifying unit 221 (step S61). Operation same as the operation at steps S51 to S53 is executed at steps S62 to S64. When the operation at step S64 ends, the commit executing unit 224 transmits update end notification to the commit-request notifying unit 221 (step S65).

As explained above, according to the second embodiment, the ATA manager causes the DRAM to accumulate and store the AM information DRAM log. The data manager reflects the accumulated and stored AM information DRAM log on the AM information at specific timing and causes the NAND memory to accumulate and store the AM information DRAM log as the AM information NAND log. Therefore, an effect same as that in the first embodiment can be obtained.

In the above explanation, the commit-request notifying unit 221 issues the commit request notification and uses the commit request notification as a trigger for the fourth commit processing. However, because the AM information is non-volatilized by the third commit processing as well, the commit-request notifying unit 221 can be omitted.

Figure 9:
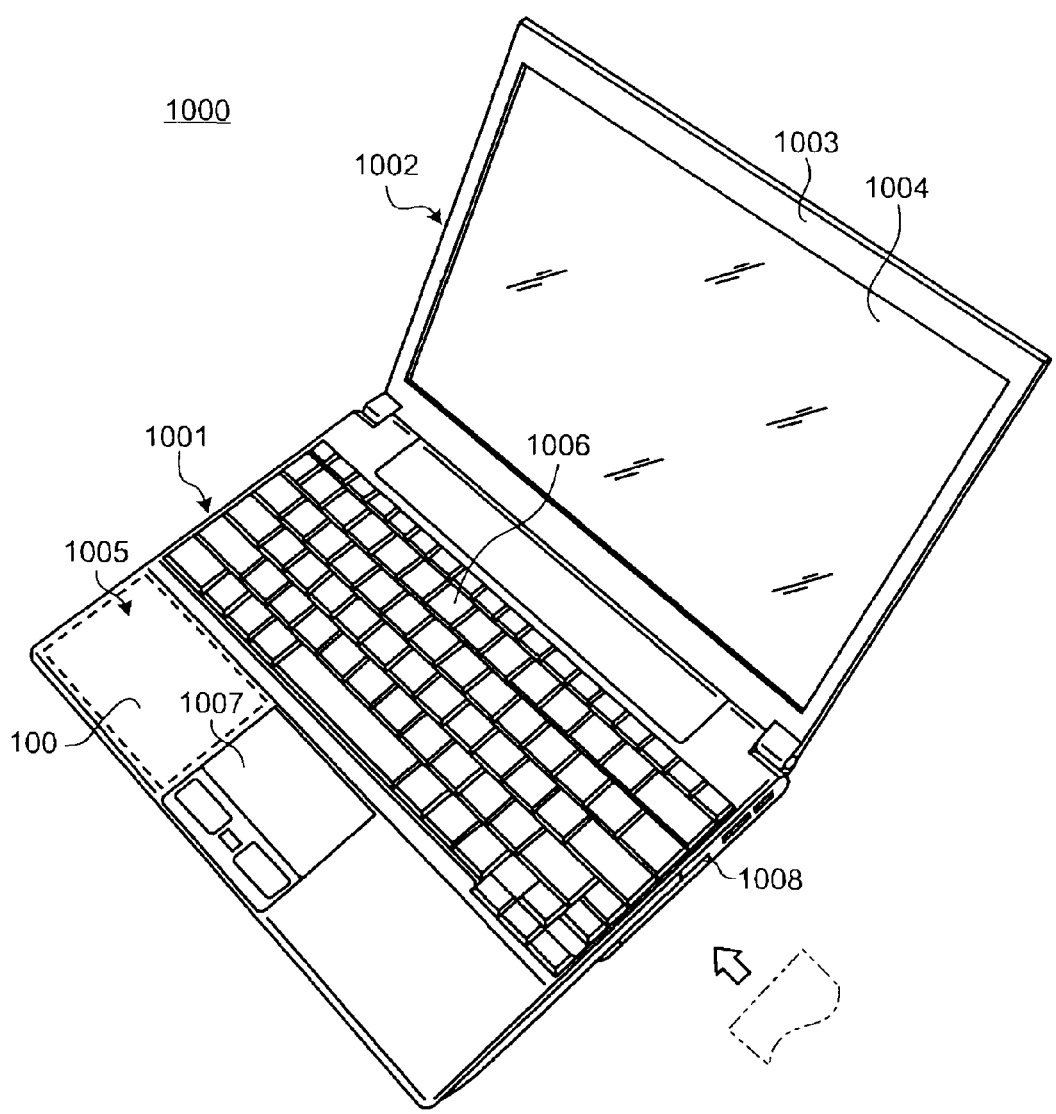
FIG. 9 is a perspective view of an example of a personal computer mounted with the SSD.

FIG. 9 is a perspective view of an example of a personal computer 1000 mounted with the SSD 100. The personal computer 1000 includes a main body 1001 and a display unit 1002. The display unit 1002 includes a display housing 1003 and a display device 1004 housed in the display housing 1003.

The main body 1001 includes a housing 1005, a keyboard (KB) 1006, and a touch pad 1007 as a pointing device. A main circuit board, an optical disk device (ODD) unit, a card slot, the SSD 100, and the like are housed in the housing 1005.

The card slot is provided adjacent to a peripheral wall of the housing 1005. An opening 1008 opposed to the card slot is provided in the peripheral wall. A user can insert and remove an additional device in and from the card slot through the opening 1008 from the outside of the housing 1005.

The SSD 100 can be used in a state in which the SSD 100 is mounted in the personal computer 1000 as a replacement for a HDD in the past or can be used as an additional device in a state in which the SSD 100 is inserted in the card slot included in the personal computer 1000.

Figure 10:
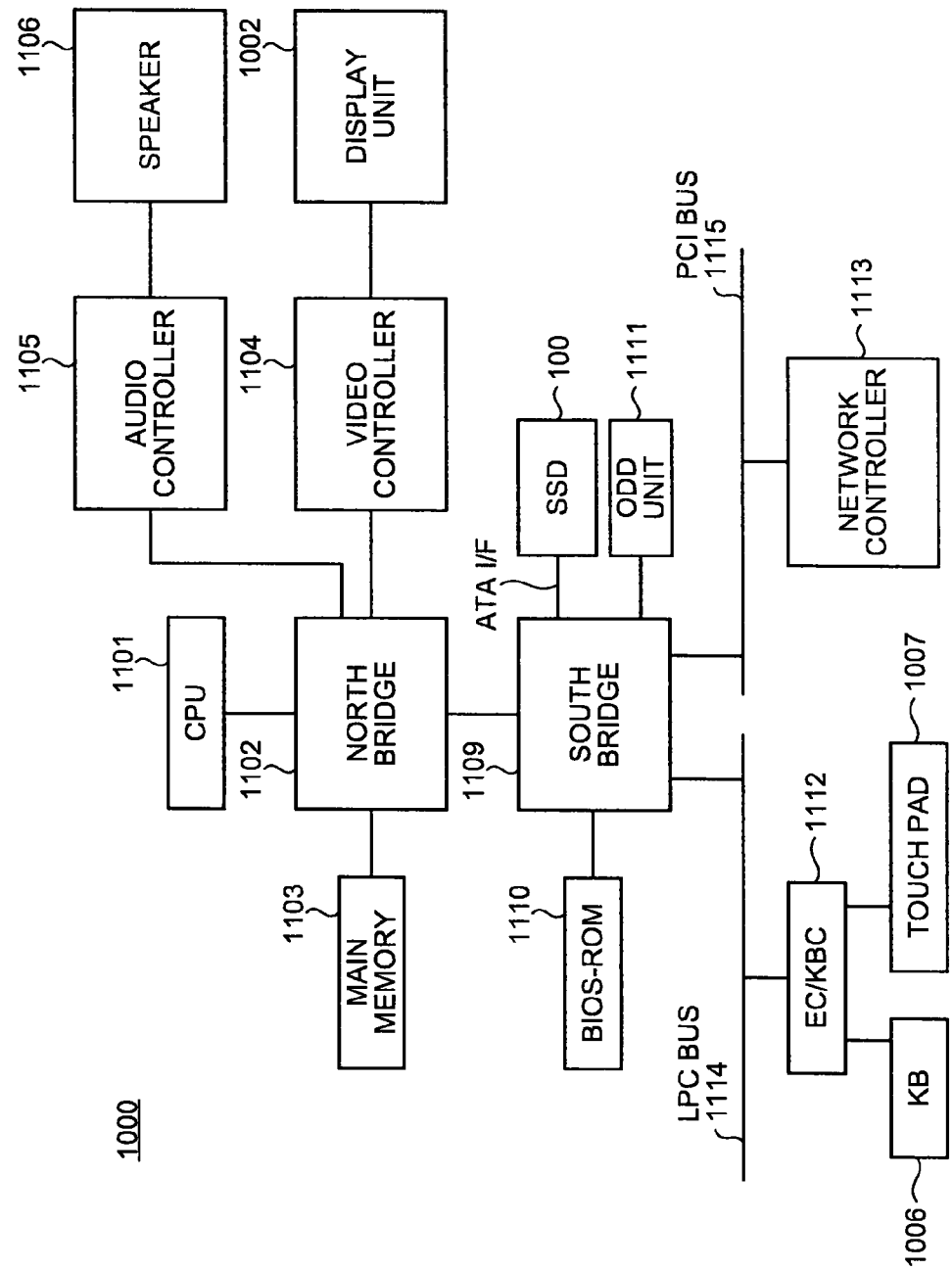
FIG. 10 is a diagram of a system configuration example of the personal computer mounted with the SSD.

FIG. 10 is a diagram of a system configuration example of the personal computer 1000 mounted with the SSD 100. The personal computer 1000 includes a CPU 1101, a north bridge 1102, a main memory 1103, a video controller 1104, an audio controller 1105, a south bridge 1109, a basic input output system (BIOS)-ROM 1110, the SSD 100, an ODD unit 1111, an embedded controller/keyboard controller IC (EC/KBC) 1112, and a network controller 1113.

The CPU 1101 is a processor provided to control the operation of the personal computer 1000. The CPU 1101 executes an operating system (OS) loaded from the SSD 100 to the main memory 1103. When the ODD unit 1111 enables execution of at least one of readout processing and writing processing for an inserted optical disk, the CPU 1101 executes the processing.

The CPU 1101 also executes a system BIOS stored in the BIOS-ROM 1110. The system BIOS is a program for hardware control in the personal computer 1000.

The north bridge 1102 is a bridge device that connects a local bus of the CPU 1101 and the south bridge 1109. A memory controller that controls access to the main memory 1103 is also incorporated in the north bridge 1102.

The north bridge 1102 also has a function of executing communication with the video controller 1104 and communication with the audio controller 1105 via an accelerated graphics port (AGP) bus or the like.

The main memory 103 temporarily stores programs and data and functions as a work area for the CPU 1101. The main memory 1103 includes, for example, a DRAM.

The video controller 1104 is a video reproduction controller that controls the display unit 1002 used as a display monitor of the personal computer 1000.

The audio controller 1105 is an audio reproduction controller that controls a speaker 1106 of the personal computer 1000.

The south bridge 1109 controls devices on a low pin count (LPC) bus 1114 and devices on a peripheral component interconnect (PCI) bus 1115. The south bridge 1109 controls the SSD 100, which is a storage device that stores various kinds of software and data, via an ATA interface.

The personal computer 1000 accesses the SSD 100 in sector units. A writing command, a readout command, a flash command, and the like are input to the SSD 100 via the ATA interface.

The south bridge 1109 also has a function for controlling access to the BIOS-ROM 1110 and the ODD unit 1111.

The EC/KBC 1112 is a one-chip microcomputer in which an embedded controller for power management and a keyboard controller for controlling the keyboard (KB) 1006 and a touch pad 1007 are integrated.

The EC/KBC 1112 has a function of turning on and off a power supply for the personal computer 1000 according to operation of a power button by the user. The network controller 1113 is a communication device that executes communication with an external network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
  an interface unit coupled to a host apparatus;
  a volatile first storing unit configured to store status information for notification to the host apparatus and address translation information;
  a nonvolatile second storing unit configured to store update information of the status information and the address translation information; and
  a controller including:
    a first management unit that controls data transfer between the host apparatus and the first storing unit via the interface unit and that manages the status information, and
    a second management unit that controls data transfer between the first storing unit and the second storing unit and that manages the address translation information; wherein
  the first management unit includes:
    an information writing unit that updates the status information according to a status of the memory system,
    an update information managing unit that manages update information indicating an updated section of the status information updated by the information writing unit, and
    an update information notifying unit that notifies the second management unit of the update information managed by the update information managing unit;
  the second management unit includes:
    an information controlling unit that updates the address translation table and that stores first difference information of the address translation information in the first storing unit; and
    a commit executing unit that collects, based on the update information, second difference information of the status information from the first storing unit when the update information is notified from the update information notifying unit, and accumulates the first and second difference information in the second storing unit.

2. The memory system according to claim 1, wherein
  the data transfer between the host apparatus and the first storing unit via the interface unit conforms to an ATA interface standard, and
  the status information is management information for a self-monitoring analysis and reporting technology (SMART) function supported by the ATA interface standard.

3. The memory system according to claim 2, wherein the management information for the SMART function includes at least one of a cumulative number of times of read and write errors and cumulative operation time.

4. The memory system according to claim 1, wherein
  the second management unit includes a snapshot executing unit that copies the status information in the nonvolatile second storing unit.

5. The memory system according to claim 1, wherein
  the update information includes a starting address and a size of the updated section.

6. The memory system according to claim 1, wherein the first storing unit is DRAM and the second storing unit is a NAND flash memory.

7. A memory system comprising:
  an interface unit coupled to a host apparatus;
  a volatile first storing unit configured to store status information for notification to the host apparatus and address translation information;
  a nonvolatile second storing unit configured to store update information of the status information and the address translation information; and
  a controller including:
    a first management unit that controls data transfer between the host apparatus and the first storing unit via the interface unit and that manages the status information, and
    a second management unit that controls data transfer between the first storing unit and the second storing unit and that manages the address translation information; wherein
  the first management unit includes:
    an information writing unit that causes the first storing unit to accumulate, in the first storing unit, first difference information of the status information; and
  the second management unit includes:
    an information controlling unit that updates the address translation table and that stores second difference information of the address translation information in the first storing unit; and
    a commit executing unit that reflects the first difference information and the second difference information on the address translation information in the first storing unit at a specific timing and accumulates the first and second difference information in the second storing unit.

8. The memory system according to claim 7, wherein
  the data transfer between the host apparatus and the first storing unit via the interface unit conforms to an ATA interface standard, and
  the status information is management information for a self-monitoring analysis and reporting technology (SMART) function supported by the ATA interface standard.

9. The memory system according to claim 8, wherein the management information for the SMART function includes at least one of a cumulative number of times of read and write errors and cumulative operation time.

10. The memory system according to claim 7, wherein
  the second management unit includes a snapshot executing unit that copies the status information in the nonvolatile second storing unit.

11. The memory system according to claim 7, wherein
  the update information includes a starting address and a size of the updated section.

12. The memory system according to claim 7, wherein the first storing unit is DRAM and the second storing unit is a NAND flash memory.

13. A managing method for a memory system comprising:
  storing, in a volatile first storing unit, a status area for storing status information for notification to a host apparatus and address translation information;
  storing, in a nonvolatile second storage unit, update information of the status information and the address translation information;

updating the status information according to a status of the memory system and generating update information indicating an updated section of the status information;

collecting, based on the update information, first difference information of the status information from the first storing unit;

updating the address translation information according to data movement in the memory system and generating second difference information; and accumulating the first and second difference information in the second storing unit.

14. The managing method according to claim 13, further comprising:

transferring data between the host apparatus and the first storing unit via the interface unit with conforming to an ATA interface standard, wherein the status information is management information for a self-monitoring analysis and reporting technology (SMART) function supported by the ATA interface standard.

15. The managing method according to claim 14, wherein the management information for the SMART function includes at least one of a cumulative number of times of read and write errors and cumulative operation time.

16. The managing method according to claim 13, further comprising:

copying the status information in the nonvolatile second storing unit.

17. The managing method according to claim 13, wherein the update information includes a starting address and a size of the updated section.

18. The managing method according to claim 13, wherein the first storing unit is DRAM and the second storing unit is a NAND flash memory.

19. A personal computer comprising the memory system according to claim 1.

20. A personal computer comprising the memory system according to claim 7.

* * * * *